United States Patent
Azagury et al.

(10) Patent No.: US 9,928,062 B2
(45) Date of Patent: Mar. 27, 2018

(54) ISA-PORTED CONTAINER IMAGES

(71) Applicant: International Business Machines Corporation, Armonk, NY (US)

(72) Inventors: Alain C. Azagury, Haifa (IL); Ilsiyar I. Gaynutdinov, Lobnya (RU); Erez Hadad, Nahariya (IL); Sadek Jbara, Taybeh (IL); Igor Khapov, Moscow (RU); Alexey Miroshkin, Moscow (RU); Nitzan Peleg, Haifa (IL); Indrajit Poddar, Sewickley, PA (US); Michael Rodeh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/060,750

(22) Filed: Mar. 4, 2016

(65) Prior Publication Data
US 2017/0255462 A1    Sep. 7, 2017

(51) Int. Cl.
*G06F 8/76*    (2018.01)
*G06F 9/44*    (2018.01)
*G06F 9/30*    (2018.01)

(52) U.S. Cl.
CPC ............ *G06F 8/76* (2013.01); *G06F 9/30145* (2013.01); *G06F 9/30181* (2013.01)

(58) Field of Classification Search
CPC ..... G06F 8/76; G06F 9/30145; G06F 9/30181
See application file for complete search history.

(56) References Cited

U.S. PATENT DOCUMENTS

| | | | | |
|---|---|---|---|---|
| 8,327,354 | B1* | 12/2012 | Magenheimer | G06F 9/45554 711/206 |
| 8,423,976 | B2 | 4/2013 | Zwirner et al. | |
| 2013/0263103 | A1 | 10/2013 | Choudhury | |
| 2014/0380306 | A1* | 12/2014 | Chan | G06F 9/45558 718/1 |
| 2016/0217050 | A1* | 7/2016 | Grimm | G06F 11/203 714/1.11 |

FOREIGN PATENT DOCUMENTS

WO    2015088374 A1    6/2015

OTHER PUBLICATIONS

Unknown, "Industry Leaders Unite to Create Project for Open Container Standards", Docker News and Press, Jun. 22, 2015. https://www.docker.com/docker-news-and-press/06.22.2015_Industry-Leaders-Unite-to-Create-Project-for-Open-Container-Standards. Last printed Mar. 2, 2016. 10 pages.

(Continued)

*Primary Examiner* — Li B Zhen
*Assistant Examiner* — Amir Soltanzadeh
(74) *Attorney, Agent, or Firm* — Michael D. Purdham

(57) ABSTRACT

A software container image that includes components dependent on a first computer instruction set architecture (ISA) is ported to enable a container to execute using the container image on a computer having a second ISA different from the first. Porting the container image entails replacing components of the container image not compatible with the second ISA with equivalent components compatible with the second ISA. The porting is performed, in some instances, dynamically as part of running a container with the container image on a computer implementing the second ISA.

17 Claims, 7 Drawing Sheets

(56) References Cited

OTHER PUBLICATIONS

Unknown, "Running Qemu-user on Chroot", Cross Container Support Project—Gentoo Wiki. https://wiki.gentoo.org/wiki/Cross_Container_Support_Project Last modified Apr. 9, 2015. Last printed Mar. 2, 2016. 4 pages.

Unknown, "Cross-Platform Hybrid Cloud with Docker", Medium.com. Originally published at dzone.com. https://medium.com/@chanwit/cross-platform-hybrid-cloud-with-docker-ded000f/92fb Last printed Mar. 3, 2016. 10 pages.

Unknown, "QEMU User Emulation", Debian Wiki. https://wiki.debian.org/QemuUserEmulation Last printed Mar. 2, 2016. 5 pages.

Unknown, "file (command)", Wikipedia, the free encyclopedia. https://en.wikipedia.org/wiki/File_(command) Last printed Mar. 2, 2016. 4 pages.

Unknown, "Cross-architecture Linux containters in Debian", Kranz Korner. 3 pages, last printed Mar. 2, 2016. https://dktrkranz.wordpress.com/2013/11/19/cross-architecture-linux-containers-in-debian/.

* cited by examiner

ISA-PORTED CONTAINER IMAGES

BACKGROUND

The present disclosure relates to software containers. More particular aspects relate to transforming a source container image, having components dependent on a source instruction set architecture (ISA), into a container image capable of running on a computer having a target ISA different from the source ISA.

SUMMARY

According to embodiments of the present disclosure, a computer-implemented method ports a software container image to a target instruction set architecture (ISA). The software container image is selected to execute on a computer implementing the target ISA. The method features forming a ported image that may be executed on the target ISA computer. It is an aspect of the method that the ported image may be formed as part of preparing the software container image to execute on the target ISA computer. It is another aspect of the method that the ported image may be formed as part of executing the software container image on the target ISA computer.

The method includes selecting a source image from within the software container image and to further select a source component from within the source image. It is a feature of the method to determine that the source component is not compatible with the target ISA. It is another feature of the method to include at least one first target-ISA equivalent component in the ported image, in which the first target-ISA equivalent component preforms a function equivalent to at least one function of the source component. The method replaces the source component, in the ported image, with the first target-ISA equivalent component(s).

In another feature of the method, the method determines that the source component has at least one second target-ISA equivalent component, which performs a function equivalent to at least one function of the source component. The method includes the second target-ISA equivalent component(s) in the first target-ISA equivalent component(s).

In a different feature of the method, the method determines that the source component does not have a first target-ISA equivalent component. The method forms at least one second target-ISA equivalent component, which is compatible with the target-ISA and which performs a function equivalent to at least one function of the source component. The method includes the second target-ISA equivalent component(s) in the first target-ISA equivalent component(s).

In one aspect of the method, the method determines that the source component includes a source binary file, which is not compatible with the target ISA. In a further aspect of the method, the method determines that there is at least one target-ISA equivalent binary file, in which the target-ISA equivalent binary file performs a function equivalent to at least one function of the source binary file. The method includes the target-ISA equivalent binary file(s) in the target-ISA equivalent component.

In another aspect of the method, the method determines that the source component includes a source binary file, which is not compatible with the target ISA. The method further determines that the source binary file does not have a target-ISA equivalent binary file. The method includes the source binary file in the target-ISA equivalent component, and includes a target-ISA stub program in the target-ISA equivalent component. The target-ISA stub program invokes execution of the source binary file, and invokes execution of an ISA translator. Executing the ISA translator translates the source binary file from the first ISA to the target ISA. In one aspect of the method, the method includes the ISA translator in the target-ISA equivalent component.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
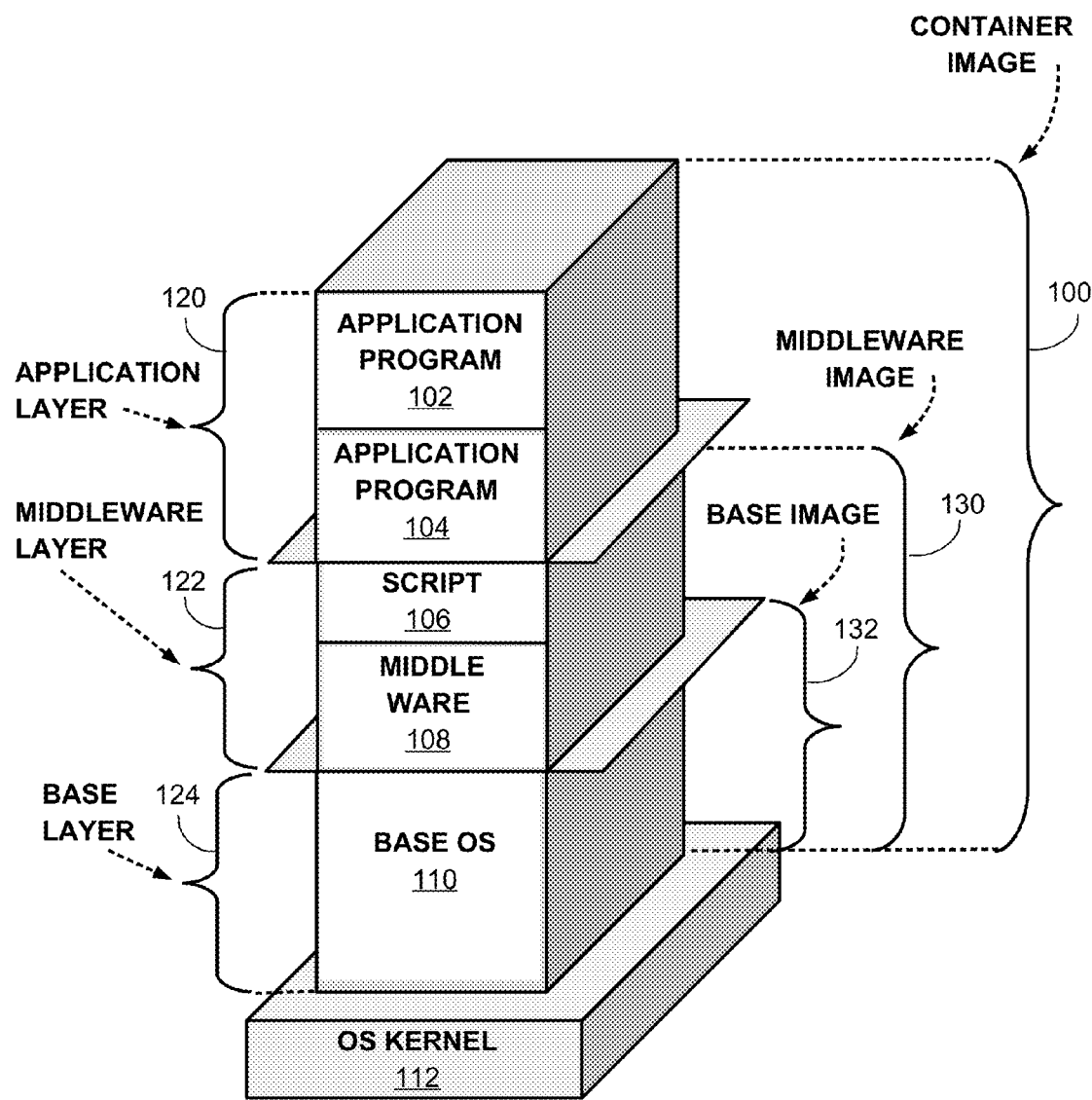
FIG. 1 is a block diagram that depicts a container structure, according to aspects of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to incorporating computer programs and files within "container images" used by software "containers". Container images include software components, which may be organized as layers and images, for execution on a computer and utilizing an underlying (or, "host") operating system (OS) or operating system kernel ("kernel"). More particular aspects relate to transforming a source container image having components dependent on a source instruction set architecture (ISA) into a target ISA container image capable of execution with a software container on a computer having an ISA different from the source ISA. While the present disclosure is not necessarily limited to such applications, various aspects of the disclosure may be appreciated through a discussion of various examples using this context.

A software "container" (hereinafter, "container") is a form of computer virtualization, which isolates execution of one or more programs (and files or file systems) with regard to other programs and resources of a computer. A container is an executable (e.g., "run-time") entity that may reference one or more container "images" and may establish a context for running a program or set of programs using, or included as, components of a container image. A Linux container is an example of a software container, as are other software container technologies such as "FreeBSD jails", or containers implemented for operating system types other than Linux.

A container may include, may describe (e.g., identify or establish amounts of), or may allocate or activate processes or resources of a computing system. The processes and resources may be used to run programs interacting with or included in a container image. A process is a runtime entity that interacts with a host operating system to execute programs within the operating system environment. A container may interact with a host OS to allocate one or more processes. A container may activate one or more processes to execute programs interacting with, or included in a container image.

A container may include resources of a computing system (or a computer) or may request an operating system to allocate particular resources of a computer system. The container, or a hosting operating system, may allocate the resources to processes included in, described by, or activated by a container. The resources may include CPUs, memory, storage, and network resources. For example, CPUs may include processors chips, cores, or threads, and a container may include the identity and an amount (number or fraction of) particular CPUs. Memory may include, for example, main memory, flash memory, or cache memory of a computer. Storage may, for example, include disk or solid-state storage (SSD), and may include the location or identity of particular storage media. Network resources may include, for example, network addresses (e.g., an IP address) or virtual or physical network interfaces (e.g., an Ethernet port).

An image may include program or data files, which may be, or include, files required for the container to execute. The programs or files contained, or referenced, in an image may be included in a file system (e.g., a set of files and a directory structure organizing the files), or a portion thereof. One or more file systems (or, portion thereof) may be included in an image, or may be referenced by programs or files within an image. A file system included in or referenced by components of an image may be the entirety, or a portion of a host (e.g., an underlying operating system) file system.

A container image may be a single image, or may aggregate a plurality of images within it. For example, a set of images within a container image may be organized in a variety of manners, such as nested within each other, stacked upon each other, or linked in some manner (e.g., using a linked-list). For purposes of illustrating the disclosure, and hereinafter, "container image" refers to a single container image, or an aggregation of images forming a container image. Programs external to a container image (e.g., an operating system) may view, or treat, a container image as a file. An image file may be in a particular format; for example, an image file may be formatted in the Tape Archive (TAR) format.

A container image may be, or may include, a file that includes, or references, one or more other component images. Images, or components of one or more images, within a container image may be embedded within the container image (e.g., as one or more image files within a larger image file) or may be referenced by a container image, or a file describing a container image.

Executing, or "running", a container may entail executing (running) programs within the image(s), or programs referencing components of the image(s), of the container on a computer. Executing a container may also include interacting with the programs included in the container image (e.g., via an operating system command line or graphical user interface, or by means of other programs). Hereinafter, "executing", or "running", a container is understood to mean executing programs within, or referenced by, a container image, as well as interacting (e.g., by a user or another program) with the components (e.g., programs, files, or file systems) of the container image.

Containers may execute within the environment and programming interfaces of an underlying (i.e., not included within the container image), or host, operating system (OS) of a computer. A host OS (e.g., a Linux operating system or Linux kernel) may enable, initiate, or control execution of the programs within a container image on a particular computer. The host OS may isolate the operations of programs within the container from other programs executing on the computer, and from resources of the computer not required by the programs within the container. A host OS may run a number of different containers, or a number of instances of the same container, on a single computer.

A container may utilize a complete host OS, or may utilize only a host OS kernel (e.g., components of an operating system that manage the hardware, such as CPUs and memory of the computer), and access to the hardware by application programs running "on top of" the operating system). Hereinafter, "host OS" refers interchangeably to an OS as a whole, or an OS kernel. Programs executing within (or, using) a container image may share the host OS with other programs executing on the same computer, including programs executing in other containers. Containers may offer many features of VMs while requiring less memory (by virtue of not requiring a complete instance of an operating system for each instance of a container), and executing with lower system overhead (by virtue of directly utilizing the underlying operating system kernel, versus an operating system in a VM-hosted environment). These advantages of containers have contributed to adoption of containers as a virtualization technology within the computing industry.

Programs within a particular container image may be "architecture independent" and, correspondingly, suitable for execution on any particular computer, without specific accommodation for the instruction set architecture ("ISA", e.g., Intel 386, Sun SPARC, IBM POWER, ARM A7, etc.) of that computer. Programs written in translated or interpreted languages—such as JAVA, bytecode, Python, or other scripting languages—are examples of programs that may be architecture independent. However, such program may execute within an underlying "run time environment", or "RTE" (e.g., a library of programs used during execution of the program) and the RTE may be generated (e.g., assembled or compiled) to execute on a computer having a particular ISA.

Other programs may be embodied within a container image as "architecture dependent", such as "binary executable" files generated (e.g., compiled or assembled) from a source language and that implement a particular ISA. A container image that includes architecture-dependent components (such as binary executable files) may be operable on only a computer implementing the particular ISA (e.g., the ISA for which a binary executable file was generated). However, it may be desirable to run a container using a container image having components dependent on one ISA on a computer having a different ISA.

To transform, or "port," an architecture dependent "ISA-1" (source) container image to run with a container on an different (target) "ISA-2" computer may require re-generating architecture-dependent components of the image (e.g., the binary executable components). Re-generating those components may be a manual process. For example, regenerating an ISA-1 dependent container image to be executable on an ISA-2 computer may require first identifying the architecture dependent ISA-1 components within the image, then locating the source language programs corresponding to those components and recompiling, or re-assembling, those components to the target ISA-2. A new container image may then be formed using the ISA-2 components.

It is undesirable to interrupt execution of a container, while running the container on an ISA-2 computer, to perform manual activities required to port ISA-1 dependent components to execute on the ISA-2 computer. Accordingly, porting a source container image to execute on an ISA-2 computer may, in practice, be limited to only a preparatory operation, performed prior to executing a container, using the ISA-2 container image, on an ISA-2 computer. Further, a source container image may need to be ported uniquely for each particular other target ISA for which it is desired to use the image. Additionally, a programmer porting a container image dependent on a particular ISA-1 to run on another, target ISA may not have access to the source language programs from which the ISA-1 components were generated. Therefore, there is a need to automate porting a source container image to run on one or more alternative, target ISAs, and to enable porting a source container image in circumstances in which the source language programs are not available for re-generation to be compatible with the target ISAs.

Accordingly, features of the present disclosure include a method and structures to automatically port a container image from one ISA to one or more other, target ISAs. Additionally, features of the present disclosure include dynamically porting components of an ISA-1 dependent (source) container image while running a container, using the source container image, on a target, ISA-2 computer. It is another aspect of the disclosure, in porting a container image from a source ISA to a target ISA, to utilize a readily available repository of container images, or image components, that may substitute a target ISA component for a source ISA component. It is further a feature of the disclosure to save a ported container image, or ported components thereof, in a readily available repository.

FIG. 1 illustrates an example container image 100 that a container may use or reference (e.g., when the container is run, or when a container is "built" to run at a later time). Container image 100 includes application programs 102 and 104, a script program 106, middleware programs 108, and a base operating system 110 (e.g., components of an OS not included in an OS kernel).

Components of a container image may reference components within that image, within another image included in the container image, or within one or more underlying file systems (e.g., components of a host file system). For example, components of container image 100, such as middleware 108 or base OS 110, may reference components of an underlying host OS kernel 112. Application program 104 may, for example, reference script 106, or may reference components of base OS 110 or OS kernel 112.

A container image may be, or may appear to be (e.g. to a container or other programs), a singular image. For example, container image 100 may include the components illustrated without those components necessarily included in other images within the container. That is, the components of middleware image 130 and base image 132 may be included within container image 100 without being organized within those middleware and base images, such that container image 100 would be then just a singular image (not shown) including all of those other image components.

Alternatively, as shown in FIG. 1, a container image may include a plurality of images within the container image. Images within a container image may be nested within each other (as shown in FIG. 1) or may be, in some other manner (not shown), aggregated within a container image, such as stacked, or linked in some manner, within a container image. For example, as shown in FIG. 1, middleware image 130 is nested within container image 100, and base image 132 is, in turn, nested within the middleware image. A file (not shown) external to a container image may describe, or reference, the components of the container image, such as a "profile" or "configuration" file that identifies, describes, or references (e.g., locates in a file system or file repository) the components of the container image.

Components of a container image may be designed to execute utilizing a particular, underlying host OS. An underlying host OS may be, for example, a particular distribution of Linux or a UNIX variant, another type of operating system that supports a form of container, or may be a kernel of such an operating system. For example, components of container image 100 may be designed to execute within, or accessed by, OS kernel 112. OS kernel 112 may be, for example, a CoreOS, Ubuntu, or other distribution of a Linux kernel.

Components of an image may be encapsulated within "layers" within an image. A layer may encapsulate a particular function or service of a computing system, such as host OS functions (e.g., networking or authority management), web hosting, storage management, or other such services or functions. In the example of FIG. 1, container image 100 has base layer 124 within base image 132, middleware layer 122 within middleware image 130, and application layer 120 within the outermost container image 100. Middleware 108, within middleware layer 122, may include, for example, web hosting. Base layer 124 may include OS functions such as network configuration and management. A layer may also add settings and configuration (not shown); for example, a layer may add or remove users, set up communication ports, or modify other configuration files used in executing the container.

Layers of a container may be hierarchical, such as forming a "stack", and one layer may be defined with reference to one or more layers below (i.e., "underlying") that layer in the stack. Components of one layer may replace, or may augment, components of a lower layer. For example, base OS 110 may include a component of OS kernel 112, such that the component included in base OS 110 replaces, or substitutes for a corresponding component of OS kernel 112. Base OS 110 may provide additional components of an OS (e.g., network support), to augment OS kernel 112 functions. Similarly, middleware layer 122 may include a component, such as a program or file system (e.g., Apache web hosting), within middleware 108 that substitutes for, replaces, or augments a program or file system included in the base OS 110 encapsulated within base layer 124.

A layer may include, or be associated with, meta-data that describes the components of the layer. The meta-data may describe the components with references to one or more lower layers within a container. For example, the meta-data may include a "change-set" that lists, or otherwise describes, files added to, removed from, or replacing files in an underlying layer. The meta-data may also include properties of the layer, such as the number of files or other indications of the size of a layer, its components, or where the layer (or, a component of the layer) starts or ends within a container.

An image may also include, or be associated with, meta-data describing the image itself, or describing components (e.g., layers) of the image. For example, an image may include a header describing a layer within the image, such as the name of the layer and the location of that layer within the image. Meta-data for an image may indicate the relationships of the layers within the image, such as which layer precedes another layer, from the bottom to the top of a hierarchical stack of layers within the image.

Meta-data may include information describing an image, or components (e.g., layers, or the contents of layers) of an image, directly. Alternatively, an image file may be associated with another file, external to (i.e., not included within) a container image, and that external file may describe the container image, or images or layers (or, the contents of the layers) and their relationships, within the image(s). Data describing, or included within an image may include, for each layer within the image, a change-set describing that layer and the change-set may describe a layer with references to files, or file systems, included in one or more underlying layers. An image may be generated with reference to a change-set associated with a lower, underlying layer.

An image may include one or more "scripts" (e.g., a set of operating system or file system commands) written in an interpreted, or script, language (e.g., PHP or Python). An image may further include an interpreter (e.g., Java, PHP, or Python) or may include a script language or interpreter runtime library (e.g., Java, PHP, or Python runtime libraries) to execute a script included in, or invoked, when the container is run. For example, container image 100 includes script component 106, which may include scripts executed when a container using container image 100 is run. Middleware 108 may include, for example, a script or language interpreter, and may include a script or interpreter runtime library, to execute one or more scripts in script 106.

An image may include an application program—such as application program 104 included in container image 100 of FIG. 1—and the application program may require, or utilize, various other components of the container. For example, application program 104 may be a program written in an interpreted language, and middleware 108 may include an interpreter program and a runtime library for that interpreter. The interpreter may execute the application program 104 (by means of interpreting the program statements) and may utilize a runtime library included in middleware 108, or in another component of the container, or the computer system that executes the container.

Some programs within an image (including programs written in an interpreted programming language) may be in a binary executable format, and may then operate with only a particular computer instruction-set architecture (ISA), such as ARM, MIPS, POWER, x86, or any of a variety of other processor ISAs. For example, application program 102 (or, middleware 108 or base OS 110) may be, or include, a binary executable file, or a set of binary executable files. Application program 102 may have been generated (e.g., compiled, or assembled) for a particular x86 (e.g., i386) ISA and, correspondingly, the container may be capable of execution only on a computer that implements that particular x86 ISA.

Figure 2:
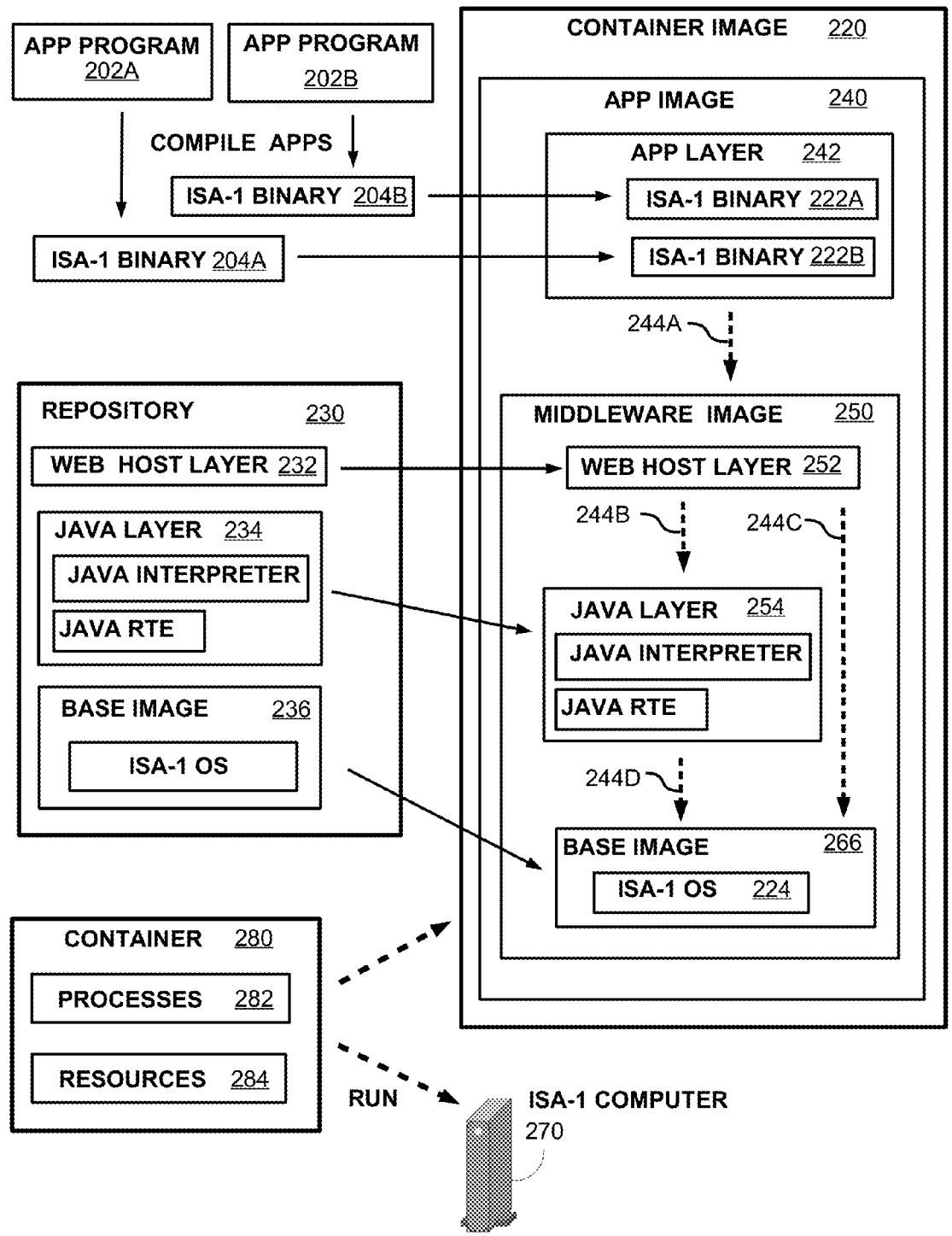
FIG. 2 is a diagram that illustrates source components included in a container, according to features of the disclosure.

FIG. 2 illustrates, in an embodiment, assembling components into (or, "building") a container image 220 for an application program. FIG. 2 illustrates container image 220 as suitable for use with a container that may be run on a computer 270 that implements a particular ISA, ISA-1. Container 280 may execute on ISA-1 computer 270 and may use container image 220 while executing on computer 270. Container 280 includes one or more processes 282, which may execute programs using, or included in, container image 220. Container 280 includes resources 284, which may be resources of computer 270, or a computing system that includes computer 270, and which may be allocated to the processes included in container 280. A container may include processes or resources within the container or, for example, may include them by reference to them, such as components of a computer (e.g., computer 270), or a computing system, used to execute a container. The resources may include CPUs, memory, storage, or network resources.

To prepare an application program to be run in a container (or, for inclusion in a container image), the application program may be compiled from program source code to a binary executable file targeting a particular computer ISA. For example, as shown in FIG. 2, application programs 202A and 202B are compiled to "ISA-1" binary executable code files 204A and 204B, respectively, for inclusion in container image 220. Alternatively, but not shown, an application program, such as application program 202A, may be written in an interpreted language (e.g., Java, PHP, or Python) or script, and the program, or script, may be included (not shown) in a container image, such as container image 220, as a program file in the program source language format.

The application program(s) may be included in one or more layers within a container image. An application layer may be included with one or more other underlying layers of a stack of layers. For example, application programs 202A and 202B are included in application layer 242 as ISA-1 binaries (e.g., binary executable files) 222A and 222B, respectively. Container image 220 further illustrates an image including additional layers (and, images) underlying an application layer, 242, in a stack organization. For example, base image 266 forms the lowest component image in the stack, Java layer 254 sits immediately above the base image, and web host layer 252 is immediately above the Java layer and immediately underlying application layer 242.

A particular layer may change components of, or relative to, one or more images, or layers, underlying it, indicated in FIG. 2 by 244A through 244D. For example, base layer 266 may add, remove, or replace files in an underlying host file system (not shown). Java layer 254 may add, remove, or replace (244D) files in the base image, and web host layer 252 may add, remove, or replace (244B) files in the Java layer, as well as (244C) in the base image. Application layer 242 may add, remove, or replace (244A) files in the middleware image 250 of the container image 220. The changes may be described by, or included, in a change-set and the change-set may be a file (or, set of files) or other form of specification included in the container image, or included in a profile or configuration file describing the container or container image(s).

A container image may include one or more layers, or other components, within a singular container image (not shown). For example, container image 220 may include application layer 242, web host layer 252, java layer 254, and ISA-1 OS 224 without including them in the images illustrated as containing them within container image 220. Alternatively, a container image may, as shown, include various layers within particular other images within the container image. Further, for purposes of illustrating the disclosure, but not limiting embodiments, images within a container image may be nested within each other and the container image. For example, application image 240 may be built by incorporating middleware image 250, and middleware image 250 may be built by incorporating base image 266 as a component within it. Application image 240 is built including application layer 242 and middleware image 250 beneath application layer 242. The various other layers underlying application layer 242 are incorporated as components of the middleware image 250. Base image 266 is incorporated into container image 220 as a component of middleware image 250.

While including layers, or other images, within an image is illustrative of the disclosure, including layers, or other images, within an image is not intended to be limiting to embodiments. It would be apparent to one of ordinary skill in the art to apply other structures to organize layers, or images, or other components (e.g., programs, files, or file systems) within a container image. Further, while layers organized as a stack is illustrative of the disclosure, a stack structure is not intended to be limiting to embodiments. It would be apparent to one of ordinary skill in the art how to apply other structures to organize layers within an image.

Incorporating a layer, or an image, into a container image may be accomplished by direct inclusion of a layer, or an image file, within the container image. Alternatively, incorporating a layer, or an image, into a container image may be accomplished by a reference from the container image to a location of the layer (or, components of the layer, or an image) within a file system included in a container image, or accessible to a container when the container is run.

In some embodiments, components of a container image may be created independently of other components. For example, components of middleware image 250, or base image 266, may be created prior to, and independent of, creating (e.g., compiling) the ISA-1 binary files 204A and 204B of FIG. 2. Middleware image 250 or base image 266 may be common images, used by a variety of containers that may include different application (or, other) layers than that of container image 220.

Some layers (or, images) of a container may be provided from a file repository. For example, FIG. 2 illustrates layers within container image 220, and component images within container image 220, incorporated from repository 230. Web host layer 232, for example, is stored in repository 230 and incorporated into middleware image 250 as web host layer 252 from the repository. Further, java layer 254 is incorporated in middleware image 250 from repository 230 java layer 234, and base image 266 from repository 230 base image 236.

A file repository, such as repository 230, may be a file system, or a component of a file system. A repository may be, or may include, a registry of particular, functional layers or images. A repository may identify particular layers, or images, as having particular ISA dependencies, and may identify the particular ISA that is compatible with a particular layer or image in the repository. Images within a repository may include layers within the images (not shown), and the images may include only a single, particular layer, or may include a plurality of layers. Layers within an image may be organized as a stack, having a lowest level layer and successive layers laid upon each other. Layers within an image may include a change-set identifying changes to the file system of an underlying layer.

A file repository may be included (and may include storage) within a computer on which a container is built, or run, or on which a container image is built. Alternatively, a repository may be, or be included in, a file system accessible to a computer on which a container is built, or run, or on which a container image is built. For example, a repository may be included in a network file system, or a file system encompassing files within a Storage Area Network (SAN), or a remote computer service which hosts component images. A repository may be "well-known", such as particularly designated within a development organization, or on the Internet, to retain common images or layers used in a variety of different containers, and by different software developers, or end-users, when creating or running containers. Such a well-known repository may enable a variety of independent software developers to re-use layers, or images, created by other developers and thereby avoid duplication of effort to develop functions provided by those layers or images.

As illustrated in FIG. 2, one or more components of a container image may be, or include, binary executable program files, which may be, then, architecture-dependent on a particular ISA. ISA-1 binary executable files 222A and 222B, and ISA-1 OS 224, illustrate architecture-dependent components of container image 220 that are dependent on ISA-1. Correspondingly, a container using container image 220 may be executable only on a computer that implements ISA-1, such as illustrated with respect to ISA-1 computer 270.

The process of creating (or, building) a container image may be performed manually. A software developer may, for example, utilize a user interface (e.g., a command line or GUI) to locate or assemble components of a container image. For example, a software developer may locate base image 266, java layer 254, and web host layer 252 of container 220 using corresponding elements 236, 234, and 232, respectively, in a repository such as 230. A software developer may, for example, generate application binaries 222A and 222B from source files (e.g., 204A and 204B, respectively) located in a particular file system of a computer used by the developer, or by the organization employing the developer.

A software developer may specify the order in which a container image is to incorporate components of the image. For example, a software developer may specify that base image 266 is to be incorporated first (e.g., as the lowest in a stack), java layer 254 on top of the base image, web host layer 252 on top of these, and application layer 242 as the topmost layer in the container image. A software developer may manually form an image to encapsulate one or more layers, such as manually forming middleware image 250 to encapsulate the web host layer, java layer, and base image of container image 220. Likewise, a software developer may manually form a layer to encapsulate particular components, such as forming application layer 242 to encapsulate ISA-1 binaries 222A and 222B.

A software developer may use a user interface, a text editor, or other manual method to create a file—such as a profile or configuration file—to describe the components of a container image or their organization within the image. A software developer may sequentially specify to the user interface commands that assemble a container image, such as assembling layers, or images, of a container from the lowest to highest in a stack of layers. The user interface may be part of a container manager program (or, utility), such as Docker, or may be part of an operating system, or operating system extension such as LXC (i.e., Linux Container extensions).

Alternatively, a container management program (e.g., Docker) may create a container image, provided particular inputs identifying components of the container, locations (e.g., in a file system) at which to obtain the components, and the order or relative differences between layers (or images) within a container. For example, a container management program may utilize a configuration file (not shown in FIG. 2) that may specify the components, and organization thereof, of a container image. A configuration file may specify that particular components are to be included in particular layers of the container image, or that particular components are to have certain attributes (e.g., read/write or read-only) with regard to running the container. For example, a configuration file may specify the various layers illustrated in container image 220 in the order (from bottom to top) in which they are incorporated, and the locations from which to obtain various components (e.g., within repository 230 or the storage locations of ISA-1 binaries 204A and 204B).

Running a container may include executing programs included in the container image that are generated for a particular ISA. For example, programs 222A and 222B in container image 220, generated for ISA-1, may limit running a container using the container image 220 to a computer that implements ISA-1 (e.g., computer 270). Accordingly, the present disclosure features running a container in a manner that renders a container image having components generated for one ISA on a computer that implements an alternative ISA.

Figure 3:
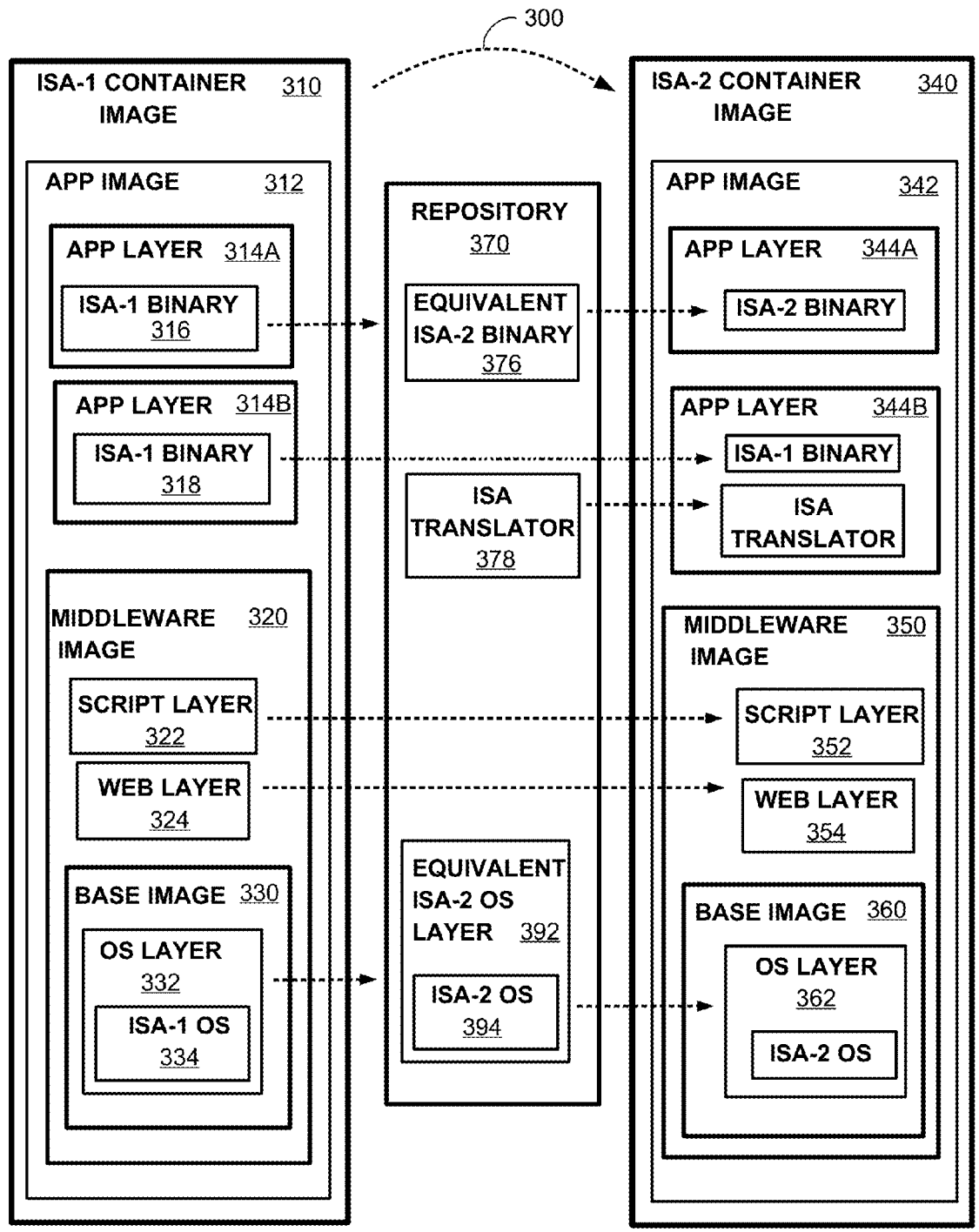
FIG. 3 is a diagram that illustrates porting a source container to a target ISA container, according to features of the disclosure.

FIG. 3 illustrates an example embodiment porting 300 an ISA-1 container image to a container image capable of being run in a container on a computer that implements a different ISA, ISA-2. Container image 310 includes application image 312, middleware image 320 within the application image, and base image 330 within the middleware image. Container image 340 includes application image 342, middleware image 350 within the application image, and base image 360 within the middleware image, corresponding to the images 312, 320, and 330, respectively, in container image 310.

Container image 310 further includes components generated for an ISA-1, such as ISA-1 binary executable files 316 and 318, and ISA-1 OS 334. Binary executable files 316 and 318 are included in application layers 314A and 314B, respectively, and ISA-1 OS 334 is a binary executable file included in OS layer 332. In embodiments, a component of a layer or image may be a particular file or file system, or may be a "package" that includes a set of files or file systems (hereinafter, a "package" refers to any particular set of related files and/or file systems).

To enable a container to run with container image 310, on a computer that implements ISA-2, components of container image 310 may need to be ported to, or replaced with, an equivalent component that implements or is compatible with ISA-2. FIG. 3 illustrates porting ISA-1 container image 310 to ISA-2 by forming an ISA-2 container image 340. For example, porting the ISA-1 binary files of container image 310 replaces the container image 310 ISA-1 dependent files, layers, or images (i.e., components of the container image), in container image 340 with ISA-2 equivalent files, layers, or images. An ISA-2 equivalent file, layer, or image may perform the same function as an ISA-1 file, layer, or image, and may use the same or different programs, in a form compatible with or implementing ISA-2, to perform the functions of the corresponding ISA-1 component.

Although not illustrated in FIG. 3, the resulting, or "ported", ISA-2 container image 340 may be saved to a repository, such as repository 370. In some embodiments, the ported ISA-2 container image 340 may be distinct from the source, ISA-1 container image 310. This may enable a container to be run on both ISA-1 (using the original source, ISA-1 container image 310) and ISA-2 (using the ported ISA-2 container image 340) computers. Alternatively, in an embodiment ISA-1 components of container image 310 may be ported to ISA-2 by modifying container image 310 to replace those components directly within container image 310. Such an embodiment may, correspondingly, require porting the ISA-2 container image back to ISA-1, to enable that same container to, subsequently, be run on an ISA-1 computer.

A ported ISA-2 container image may obtain component images or layers from the ISA-1 container image, or may obtain the components from a file repository, such as repository 370 in FIG. 3. To port ISA-1 components of a container image to an ISA-2 container image, some components may be provided in the ISA-2 container image identical to those of the ISA-1 container image. For example, as illustrated in FIG. 3, ISA-2 container middleware image 350 includes a script layer 352 and web host layer 354 that are identical, or may be functionally equivalent, to ISA-1 container image scripts layer 322 and web host layer 324, respectively. As indicated in FIG. 3, the ISA-2 container image script and web layers 352, and 354, respectively, or middleware image 350, may be copied directly from (or, retained as) middleware image 320. In some embodiments, these may be obtained from a file repository such as file repository 370.

Some components of an ISA-1 container image, such as layers or images containing ISA-1 binary executable files, may be dependent on ISA-1 and may not be executable on an ISA-2 computer. For example, ISA-1 container image 310 application layers 314A and 314B contain ISA-1 binary files 316 and 318, and OS layer 332 contains ISA-1 OS 334, which are not directly executable on an ISA-2 computer. Accordingly, ISA-2 container image 340 requires porting these component as ISA-2 equivalents.

As illustrated, ISA-2 binary 376 is an equivalent of application ISA-1 binary executable file 316 and may be incorporated into application layer 344A in place of ISA-1 application layer 314A. ISA-2 binary 376 may be a program generated (e.g., compiled) from the same, or essentially the same, source program file as that used to generate ISA-1 binary 316. ISA-2 binary 376 may be included within a layer or image (not shown), and the binary equivalent file, layer, or image stored in a repository, such as illustrated by ISA-2 binary 376 stored in repository 370. Application layer 344A may be formed (or, copied) from such a binary equivalent layer or image.

Similarly, ISA-2 OS 394 may be equivalent to ISA-1 OS 334, and may include ISA-2 binaries equivalent in function to ISA-1 binaries included in ISA-1 OS 334. ISA-2 equivalent OS binaries corresponding to ISA-1 OS 334 may be included in an "ISA-2 equivalent" layer or image. For example, ISA-2 OS 394 is included in OS layer 392. Accordingly, ISA-2 container image 340 may incorporate these ISA-2 binaries, replacing the corresponding container image 310 ISA-1 OS binaries, by incorporating ISA-2 equivalent layer 392 into base image 360 as OS layer 362 (or, replacing base image 360 with an equivalent base image).

In other embodiments, an ISA-2 equivalent file, or package, which comprises an ISA-2 OS equivalent to an ISA-1 OS may be replaced individually, or may be replaced by an image (e.g., base image 360) that includes the file or package, or includes a layer (e.g., OS layer 362) that includes the file or package. ISA-2 binary 376 and ISA-2 OS 394, OS Layer 392, or base image 360 may be commonly used components and, as illustrated in FIG. 3, may be provided to container image 340 from a file repository, such as repository 370.

Alternatively, ISA-2 equivalent layers, or images, may incorporate one or more ISA-1 container ISA-1 binary files, one or more corresponding ISA-2 "stub" programs, and an ISA-1 to ISA-2 binary translator program. An ISA-2 stub program may be a program that activates the binary translator to perform the ISA-1 to ISA-2 translation at the time the ISA-1 container is run on the ISA-2 computer.

For example, ISA-1 binary 318 may not have an equivalent ISA-2 binary executable file, layer, or image. Correspondingly, a container image may form an equivalent layer (or, image)—such as application layer 344B—by incorporating into the application layer the ISA-1 binary executable file from the source container image (e.g., ISA-1 binary 318 from container image 310) with an ISA translator (e.g., ISA translator 378). As illustrated in FIG. 3, an ISA translator (or, an ISA-2 stub program, not shown) may be provided to an ISA-2 container image from a file repository. In some embodiments, an ISA translator may be a component of the computing system or an underlying host operating system or file system, and the container image (e.g., container image 340) may not include an ISA translator in the equivalent ISA-2 application layer (e.g., application layer 344B).

The equivalent ISA-2 application layer may further include an ISA-2 stub program (not shown). When the ISA-2 container image (e.g., container image 340) is run on an ISA-2 computer, the stub program may invoke the ISA translator within the equivalent ISA-2 application layer (or, within an underlying host OS or file system) to translate the ISA-1 binary executable file to ISA-2 instructions. In an embodiment, an ISA-2 stub program may be specific to executing and translating an ISA-1 binary executable file, or a particular ISA-1 binary executable file, included in an ISA-2 container image. In some embodiments, an ISA-2 stub program (not shown) may be provided to an ISA-2 container image from a file repository.

A layer or image may be processed as a unit of a container image and a layer or image then may be interchangeable, as a whole, with another, equivalent layer or image. Accordingly, layers within an image may be located and the layers replaced within that image. As illustrated in FIG. 3, OS layer 332, in ISA-1 base image 330, may be replaced in ISA-2 base image 360 (as OS layer 362) with ISA-2 OS layer 392. ISA-2 middleware image 350 may be formed by incorporating architecture-independent layers 322 and 324 identically, as-is, from ISA-1 middleware image 320, and replacing the ISA-1 layer 332 with equivalent ISA-2 layers 392, as units. In another embodiment, base image 330 may be replaced in IS2-container 340, as base image 360, using an equivalent base image (not shown), and the equivalent base image may be provided from a repository.

While not shown in FIG. 3, in embodiments an ISA-2 container image ported from an ISA-1 container image may be saved to a file repository, such as repository 370. In the case that a container implements a commonly required or valuable function, saving the ISA-2 container image to a file repository, such as repository 370, may then enable use of the container image on ISA-2 computers by a variety of end-users or software developers having access to the repository. The ISA-2 container image may be saved to a repository whether the ISA-2 container is an ISA-1 container image re-built as an ISA-2 container image, or is a second, independent container image. Further, in embodiments an ISA-1 container image may be ported to a plurality of differing ISAs, to enable the ISA-1 container to be run on a variety of other, differing ISA computers. For example, a container image built for an x86 ISA may be ported to a second ARM container image, and to a third i386 container image, and the resulting ARM and i386 container images may be saved to a file repository.

Figure 4:
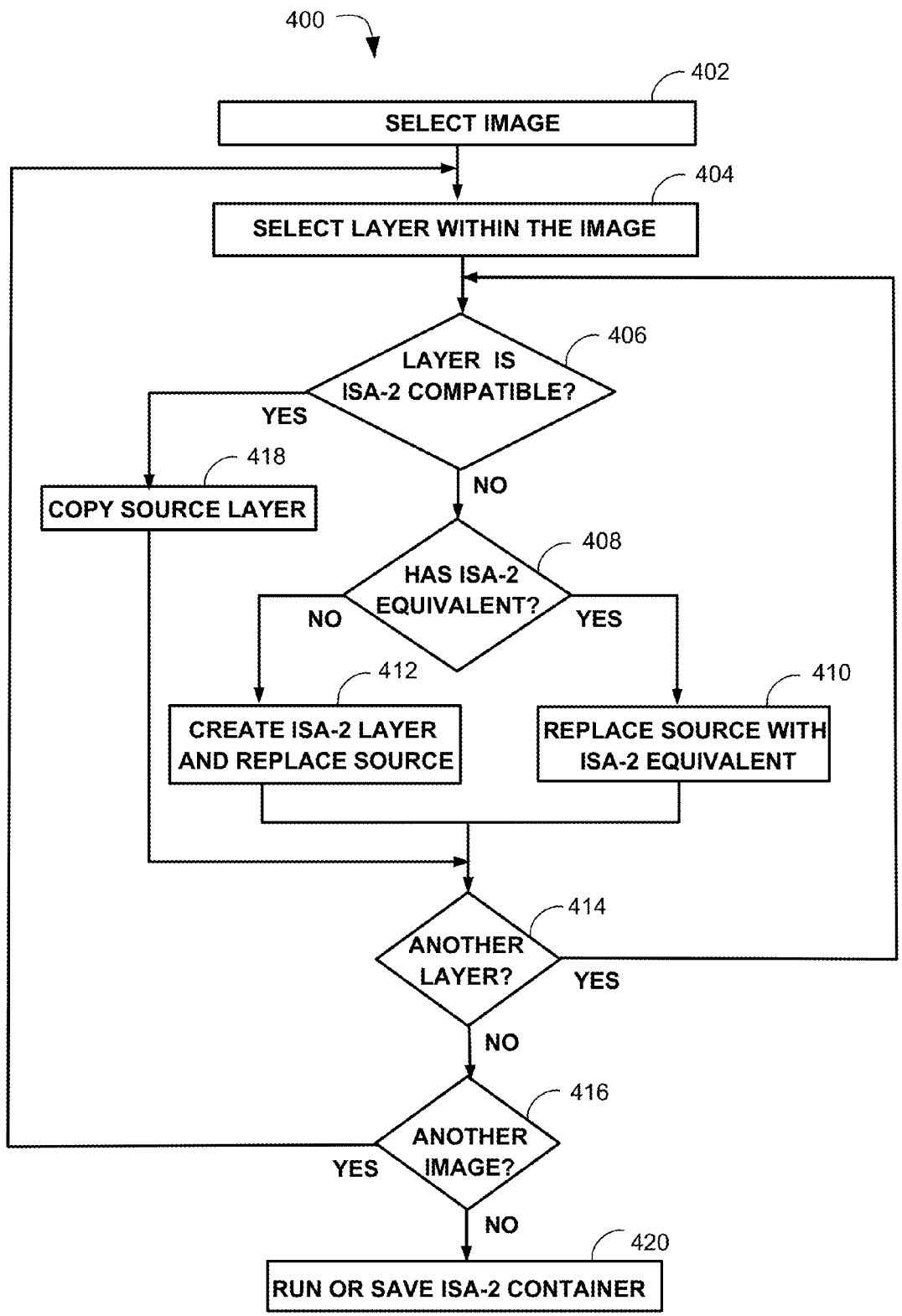
FIG. 4 is a flowchart that illustrates an example method to port a source container to a target ISA container, according to features of the disclosure.

FIG. 4 illustrates an example method 400 for porting a source container image dependent upon a particular source ISA, "ISA-1", to a container image compatible with a different, target ISA, "ISA-2". ISA-1 and ISA-2 may be any particular ISA and are used herein only to distinguish a source ISA from a different, target ISA. Accordingly, with respect to the disclosure of FIG. 4, "ISA-1" refers to a "source ISA", and vice-versa, and "ISA-2" refers to a "target ISA", and vice-versa.

It is one aspect of the disclosure that the method may be performed prior to executing a container with the source container image on a target ISA computer, to prepare the container image (or, a copy of the container image) for subsequent use with a container executed on a target ISA computer. Within the scope of the disclosure, the method may be performed on a computer implementing any of a variety of ISAs and configured to perform the method. It is another feature of the disclosure that the method may be performed on a source container image dynamically, as an aspect of starting or running a container, with the source container image, on a target ISA computer.

For purposes of illustration, but not limiting embodiments, the method of FIG. 4 is described as performed by a container manager component of a computer or computing system. A container manager may be a program or a hardware component, or a combination of both. A container manager may be utilized to initiate or control execution of a container and may associate a container with a container image. A container manager may provide functions and/or interfaces to create (or, build) a container image, and may provide interfaces or functions to perform the method.

Further, for purposes of illustration, the method is described as the container manager performing the method to dynamically port an ISA-1 container image to an ISA-2 container image while running a container on the ISA-2 computer with the ISA-1 container image. In dynamically porting the ISA-1 container image to ISA-2, according to features of the method, the container manager modifies, or replaces, layers of the ISA-1 container image, as part of running the container on the ISA-2 computer, to enable the components of the ISA-1 container image dependent on ISA-1 to execute on the ISA-2 computer. A container manager performing the method as part of running a container on an ISA-2 computer may itself be executing on the same ISA-2 computer, or may be executing on a different computer, and the different computer may implement an ISA other than ISA-2.

Further, for purposes of illustrating the method, the container manager includes capabilities to inspect a container image, and to detect and locate images within the container, and to detect and locate layers within the images. Additionally, for purposes of illustration, but not limiting embodiments, the container manager includes capabilities to determine that particular components of a layer (or, image) are dependent on a particular source ISA and to identify, and locate, ISA-2 equivalents for ISA-1 dependent components of a layer (or, image) that are not compatible with ISA-2.

The container manager is described as having access to a file repository that may provide target ISA equivalents. A container manager may locate and utilize layers, or images, in the file repository to replace or modify ISA-1 components of the source image with ISA-2 equivalents. Additionally, and also not limiting embodiments, the method is described as optionally including the container manager saving the ported ISA-2 container image, such that it may be run again, or at a later time, on the same ISA-2 computer, or on another computer that also implements ISA-2. A container manager may save a ported ISA-2 container image in a file repository.

However, it would be apparent to one of ordinary skill in the art to perform the method using a program or component, or a combination of such, of a computer or computing system other than a container manager as disclosed herein. It would be further apparent to one of ordinary skill in the art to perform the method on a computer utilizing an ISA different from ISA-2 (e.g., ISA-1 or an ISA-3) and to perform the method to port a source container image in preparation for, and not necessarily as part of, running a container, using the ported container image, on an ISA-2 computer at another time. One of ordinary skill in the art would also appreciate that a program or component, or a combination of such, of a computer or computing system performing the method may include some but not necessarily all of the features of the example container manager illustrating the method.

With reference particularly to FIG. 4, commencing at 402 an end-user executes, or directs, the container manager to perform the method in regard to forming an ISA-2 container image using a source container image. The source container image may include components dependent on an ISA-1. For example, the end-user may interact with the container manager (e.g., using a user interface command) on a computer that implements a target ISA-2, and may direct the container manager to run a container, using the source container image, on the ISA-2 computer. Alternatively, the end-user may direct the container manager to modify the source container image, or to create a modified copy of the source container image, to run on an ISA-2 computer. The end-user may direct the container manager to save the modified, ISA-2 container image to run at another time (or, possibly, on another computer that also implements ISA-2). It would be evident to one of ordinary skill in the art that the end-user may be a human user, or may be a program running on a computer that is, or is in communication with, the ISA-2 computer.

A source (or, target) container image, as previously disclosed, may be a file that includes component layers or images, or may be described by a profile or configuration file that references components (e.g., layers, images, changesets, files, or file systems) of the container image. For purposes of illustrating the features of the disclosure, hereinafter within the disclosure, "container image" refers interchangeably to a file including the components of a container image within the file, to a profile or configuration file that describes, or references, the components of the container image, or to a combination thereof.

At 402, the container manager locates and selects a first image in the source container image. The selected image may be, for example, an outermost image of a set of nested images, or may be the topmost image in a stack of images, included in the source container image. The source container image may be a singular image (i.e., having no other component images within it) and the selected image may be, correspondingly, the source container image itself. The source container image may include a header and the header may identify one or more images included in the source container image; the container manager may, then, use the header to identify and locate the selected image.

At 404, the container manager locates and selects a source layer in the selected image. The selected image may include a header and the container manager may use the header to locate the source layer. The source layer may be, for example, the topmost layer in a stack of layers within the image. The source layer may indicate an ISA-1 dependency for itself, or for itself and all layers within an image containing the source and additional layers. An image, or a header within an image, or a profile or configuration file for a container image, may include an indication of a particular architecture dependency (e.g., ISA-1) and the indication may apply to a particular layer, or to all layers, included within the container image, or included in a component image of a container image.

Organizations, or structures, of layers within an image or within a container image other than, for example, a stack, may be possible. Various organizations of images within a container image other than, for example, nested images may be possible. While a stack of layers within an image, and nested images within a container image, are illustrative of the method, a stack or nest structure is not intended to be limiting to embodiments. It would be apparent to one of ordinary skill in the art how to apply other structures to organize images or layers, within an image or within a container image.

At 406, the container manager inspects the source layer to determine whether it, or the selected image (as including the layer), is compatible with ISA-2. A source layer may be compatible with ISA-2 as not having any architecture-dependent components, for example. A source layer may have components (e.g., binary files) dependent on an ISA-1 and may be compatible with ISA-2. For example, ISA-2 may be a superset of ISA-1, or an ISA-2 computer (or components thereof) may be capable of executing ISA-1 instructions. Correspondingly, porting the ISA-1 component to an ISA-2 container image may utilize the ISA-1 component, or source layer, "as-is" and with no additional components required in the ISA-2 container image for the source layer ISA-1 component to be executed on an ISA-2 computer.

Alternatively, a source layer may not be compatible with ISA-2. The source layer may not be compatible with ISA-2 as having a component dependent on an ISA, ISA-1, different from ISA-2. Porting the source layer to an ISA-2 container image may require including, in the ported, ISA-2 layer, components to replace, or augment, the ISA-1 component of the source layer. These components may replace— in the ported, ISA-2 layer—the ISA-1 component of the source layer with an ISA-2 compatible component that performs an equivalent function. The ported, ISA-2 layer may include the ISA-1 component and may augment the ISA-1 component with other components that enable executing the ISA-1 component on an ISA-2 computer.

In determining whether a source layer (or, an image containing the layer) is compatible with a target ISA (e.g., ISA-2), the source layer may include a header and the header may identify a particular ISA (e.g., ISA-1) dependency. Alternatively, the name of the source layer, or the name(s) of one or more files (or other components) within the source layer, may indicate a particular ISA dependency. A profile or configuration file may be associated with the container image and the profile or configuration file may identify a particular ISA dependency. The source layer (or, image) may have been obtained from a particular file system, or file repository, and the name of the file system or repository may indicate a particular ISA dependency. It would be apparent to one of ordinary skill in the art that a variety of attributes of a layer, image, file, file system or repository including a layer or image, or a container image including a layer or image, may indicate a particular ISA dependency.

If at 406 the container manager determines that the image is compatible with ISA-2, at 418 the container manager copies the source layer to the ISA-2 container image. At 414, the container manager determines if the selected image contains another layer to process for porting. Alternatively, if the container manager determines, at 406, that the source layer contains components that are not compatible with ISA-2, then at 408 the container manager determines whether there exists an ISA-2 compatible equivalent layer, or image, that may replace the source layer, or image, respectively, in the ported container image. In some embodiments, an ISA-1 layer may have a corresponding ISA-2 compatible layer, and the ISA-2 layer may replace the ISA-1 layer in the ported container image. In other embodiments, an ISA-2 compatible layer may be included in an image, and the image may be added to, or replace, in the ported container image, a source image (e.g., selected at 402) containing the ISA-1 layer.

If, at 406, the container manager determines that the source layer is not compatible with ISA-2, at 408 the container manager determines if there is ISA-2 equivalent layer (or, image) that may replace the ISA-1 layer and a location from which to obtain that equivalent. The container manager may use a file repository to identify or to locate an ISA-2 equivalent. Alternatively, a container manager may use a file system local to a computer on which the container manager is executing, or which is accessible to the container manager, to identify or to locate an ISA-2 equivalent.

If the container manager is able to identify and locate an ISA-2 equivalent, at 410 the container manager replaces, in the ported container image, the ISA-1 layer or image with ISA-2 equivalent. In an embodiment, the container manager may replace the ISA-1 layer or image within the source container image (e.g., to modify a source container image itself). In other embodiments, a container manager may replace the source container layer or image in a second, ported (ISA-2) container image and may, then, leave the source container image unchanged.

Figure 5:
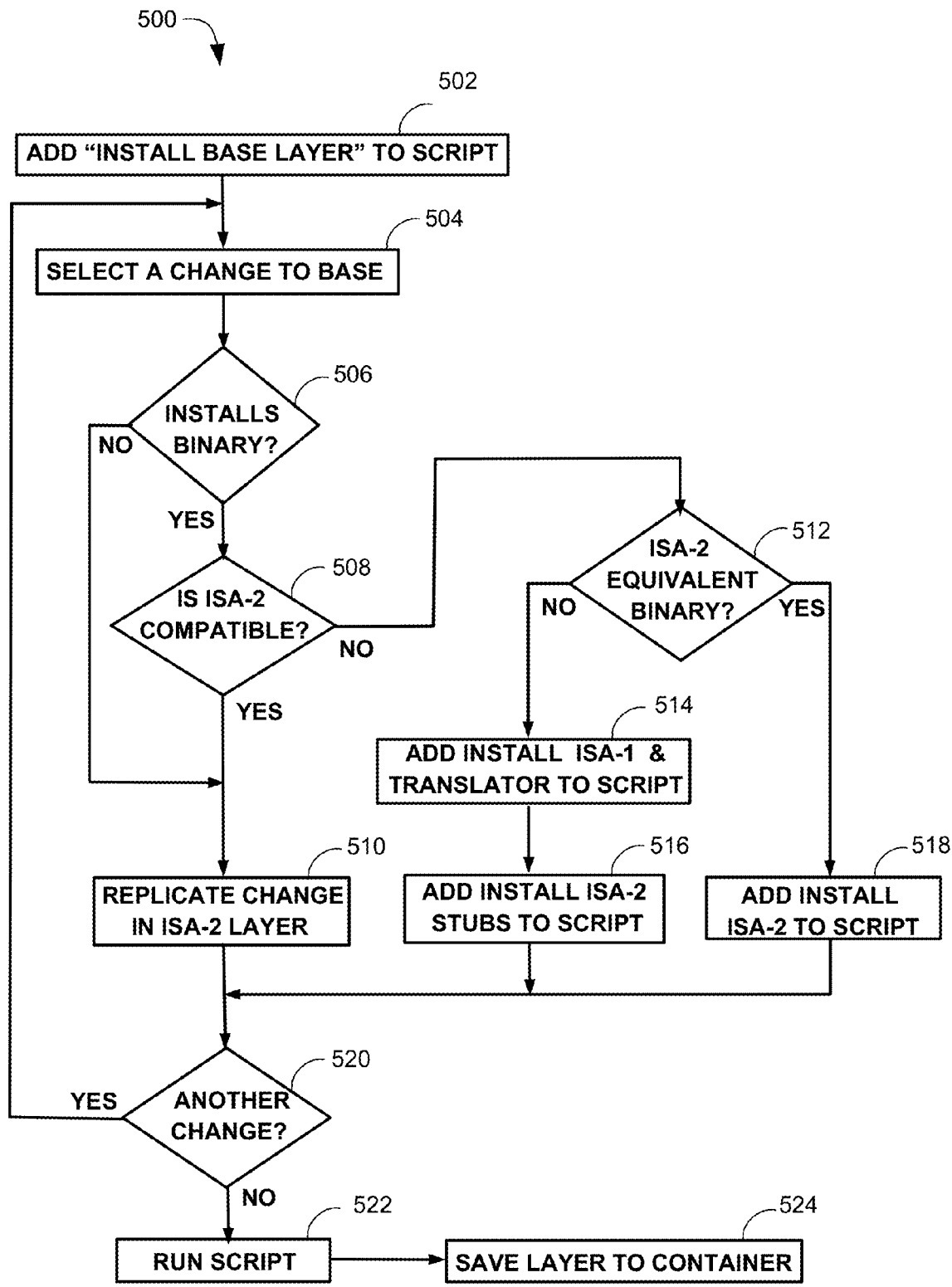
FIG. 5 is a flowchart that illustrates an example method to generate a target ISA equivalent layer of a container, according to features of the disclosure.

Alternatively, if at 408 the container manager is not able to identify or locate an ISA-2 equivalent layer or image, the container manager at 412 creates an ISA-2 layer equivalent. FIG. 5 discloses an example method to create an ISA-2 layer equivalent to a source, ISA-1 layer. In one embodiment, a container manager may create an ISA-2 equivalent by incorporating into a ported container image the source layer ISA-1 component, an ISA translator capable of translating the source layer component ISA-1 instructions to ISA-2 instructions, and an ISA-2 stub program. An ISA-2 stub program may operate to invoke the ISA translator when a container is run on an ISA-2 computer with the ported container image.

In addition, at 412, the container manager inserts the ISA-2 equivalent layer or image into the ported ISA-2 container image, in place of the source container ISA-1 layer or image. In an embodiment, the container manager may replace the ISA-1 layer or image within the source container image (e.g., to modify a source container image itself). In other embodiments, a container manager may replace the source container layer or image in a second, ported (ISA-2) container image and may, then, leave the source container image unchanged.

At 414, the container manager locates a next source layer in the selected image (e.g., the layer immediately underlying the current layer in a stack). If the image includes another layer, the container manager repeats 406 through 412 to determine if the next source layer is compatible with ISA-2 and, if not, locate or create an ISA-2 equivalent to replace that layer or image. In some embodiments, a top-most or upper layer may have an ISA-2 equivalent that includes all layers below that top-most or upper layer, and a container manager may replace the ISA-1 topmost or upper layer with that ISA-2 equivalent. In such embodiments, a container manager may omit 414, or may perform 414 for only particular layers within an image that include a set of lower layers.

If, at 414, there is not another source layer to process within the currently selected image (e.g., from 402), at 416 the container manager determines if there is another image to process within the source container image. If so, the container manager selects the next source image to repeat 404 through 416.

If the container manager determines, at 416, that there is not another image to process in the source container image, the container manager, at 420 may run, save, or run and save the ported ISA-2 container image. For example, the end-user may direct the container manager to port a container image and run a container with the ported image and, at 420, the container manager initiates execution of the container on an ISA-2 computer using the ported container image. Alternatively, an end-user may directed the container manager to port and save a ported container image to be run on an ISA-2 computer at a later time, and at 420 the container manager saves the ported ISA-2 container image. An end-user may direct the container manager to port a container image and run a container with the ported image. An end-user may also direct the container manager to save the ported container image. Accordingly, at 420, the container manager may both initiate running a container with, and saving, the ported ISA-2 container image.

The ported ISA-2 container image may be the source container image having modifications resulting from performing the method, or may be a second container image (leaving the source container image unchanged). The container manager may have access to a repository (such as disclosed in FIG. 3) and the container manager may save the ported container image in the repository. The file repository may be a well-known repository accessible to other end-users. The file repository may be included in a file system local to a computer on which the container manager is executed, or to which the container manager has access (e.g., a file system on an ISA-2 computer on which to run a container using the ported image).

While the method of FIG. 4 is illustrated with respect to porting a source container image to a container image capable of running on a particular ISA-2 computer, it would be evident to one of ordinary skill in the art that the method of FIG. 4 may be employed for a plurality of varying target ISAs. It would be further evident that the method may be employed to create a plurality of additional container images, each capable of running with a container on a particular target ISA other than that of the source container image.

FIG. 5 depicts an example method 500 to create a target "ISA-2" layer equivalent to a source layer dependent on an "ISA-1". The method may operate on a source layer within an image, or a set of layers within a source image. The method may be performed, for example, at 412 of the example method 400 of FIG. 4. ISA-1 and ISA-2 may be any particular ISA and are used herein only to distinguish a source ISA from a different, target ISA. Accordingly, with respect to the disclosure of FIG. 5, "ISA-1" refers to a "source ISA", and vice-versa, and "ISA-2" refers to a "target ISA", and vice-versa.

For purposes of illustrating the example method 500, the method is described as performed by a container manager having the features and operating in the manner of the container manager disclosed in the illustration of FIG. 4. Further, for purposes of illustration and only by way of example, the method is disclosed as producing a script, which may be incorporated into a ported container image, or may be executed to produce a ported, ISA-2, layer for incorporation into a ported container image (e.g., for incorporation into a ported container image at 412 of method 400). This illustration of the method (500) of FIG. 5 is intended only to improve understanding of the method, but is not intended to otherwise limit embodiments.

The script may be executed when a container is run with the ported container image, to port an ISA-1 layer to an ISA-2 equivalent layer as the container is executing, or may be executed to prepare an ISA-2 equivalent layer for subsequent incorporation into a ported container image. However, it would be apparent to one of ordinary skill in the art that method 500 may be employed to instantly generate (e.g., adding ISA-2 components directly into) an ISA-2 equivalent layer of a ported container image, and without generating a script to subsequently generate that ISA-2 layer.

At 502, the container manager determines the base layer underlying the source layer to be ported to an ISA-2 equivalent layer. At 502, the container manager further opens a script and adds a directive into the script to install the base layer into the ISA-2 equivalent layer. The directive may be, for example, a command to a container manager, to an operating system, or may take particular actions to modify a layer. The script may be, for example, a file in a file system that includes the ISA-1 or ported ISA-2 container images, or may be a file on or in the file system of a computer on which the container manager performs the method. The script may be a script produced prior to performing the method, and the script may include elements from performing the method previously (e.g., in porting previous, or other, layers within a source container image). In some embodiments, at 502 the container manager may not open a script or may not include this directive in the script and may, at 502, incorporate the base layer into the ISA-2 equivalent layer or the ported ISA-2 container image.

At 504, the container manager selects a particular change the source layer makes to the base, or another layer (e.g., another layer below the source layer, within a stack of layers) within a source image (e.g., an image selected at 402 of method 400). For example, a source layer may add or replace a file, or file system, in the base layer, or in another layer included in the source image. The source image, source container image, or a profile or configuration file describing the source image or source container image, for example, may include a change-set and the change-set may describe or identify a change made by the source layer.

At 506, the container manager determines if the selected change installs a binary file (e.g., a binary executable file) or a package of binary files. The changed binary file(s) may include a binary file dependent on ISA-1, which may be incompatible with ISA-2. If the change installs one or more binary files, at 508 the container manager determines if the installed binary file(s) is(are) compatible with ISA-2. As previously disclosed, an ISA-1 binary file may be compatible with ISA-2 if an ISA-2 computer is able to execute the ISA-1 binary file without additional components in the ported ISA-2 container image to enable executing the ISA-1 binary file on an ISA-2 computer.

If the container manager determines (at 506) the change does not install a binary file, or (at 508) that the change is compatible with ISA-2, at 510 the container manager installs a directive into the script to replicate the selected change in the ISA-2 equivalent layer. In some embodiments, at 510 the container manager may not include this directive in a script and may, at 510, replicate the selected change in the ISA-2 equivalent layer or the ported ISA-2 container image.

Alternatively, if the container manager determines, at 508, that the ISA-1 binary file(s) is(are) not compatible with ISA-2 at 512 the container manager determines if there is an ISA-2 equivalent binary file, or package, that may replace the ISA-1 file(s) in the ISA-2 equivalent layer, and a location from which to obtain the ISA-2 equivalent binary file or package. The container manager may have access to a file repository, and may use the file repository to identify or to locate an ISA-2 equivalent binary file or package. In some embodiments, the container manager may reference a file system included in, or accessible by, a computer on which the container manager performs the method to determine the existence or location of an ISA-2 equivalent binary file or package.

If the container manager is able to identify and locate an ISA-2 equivalent binary file or package, at 518 the container manager inserts into the script a directive to install the ISA-2 equivalent into the ported ISA-2 layer. In some embodiments, at 518 the container manager may not include this directive in a script and may, at 518, immediately install the ISA-2 equivalent binary file or package into the ISA-2 equivalent layer or the ported ISA-2 container image.

If, at 512, the container manager is not able to identify or locate an ISA-2 equivalent binary file or package, at 514 the container manager inserts into the script a directive to install the source ISA-1 binary executable file(s) into the ISA-2 equivalent layer. In some embodiments, a target ISA computer, or components (e.g., a host OS executing a container) may be capable of dynamically translating the ISA-1 binary file(s), while executing the file(s) on an ISA-2 computer, from a ported container image.

In other embodiments, the ported ISA-2 container image may require an ISA translator to dynamically translate ISA-1 instructions in the ISA-1 binary file(s) to ISA-2 instructions, as a container executes the ported ISA-2 container image on an ISA-2 computer. Correspondingly, at 514, the container manager may insert into the script a directive to install an ISA translator into the ISA-2 equivalent layer and, at 516, the container manager inserts into the script a directive to install one or more target ISA "stub" programs into the ISA-2 equivalent layer. In some embodiments, the ISA translator may be a component of an underlying layer or a file system accessible to the container when the container is run on an ISA-2 computer and, at 514, the container manager may omit the directive to install an ISA translator into the ISA-2 equivalent layer. The stub program(s) operates, when running the ported ISA-2 container image on an ISA-2 computer, to execute the ISA-1 binary file(s) under control of the ISA translator.

In some embodiments, at 514, 516, and 518 the container manager may not include one or more of the corresponding directives in a script. The container manager may, alternatively, immediately install the corresponding ISA-1 binary file or package, the ISA translator and/or ISA-2 stub program(s), or the ISA-2 equivalent binary file or package into the ISA-2 equivalent layer or the ported container image.

At 520, the container manager inspects the source ISA layer to determine if the layer includes other changes (e.g., additional changes indicated in a change-set). If there are other changes remaining, at 504 the container manager selects a next change and processes that next change in 506 through 518. If there is not another change to process, at 522, the container manager executes the script to generate the ISA-2 equivalent layer. In an alternative embodiment, a container manager may not include a script and may, accordingly omit 522. At 524, the container manager saves the ISA-2 equivalent layer to the ported container image, completing the method.

Figure 6:
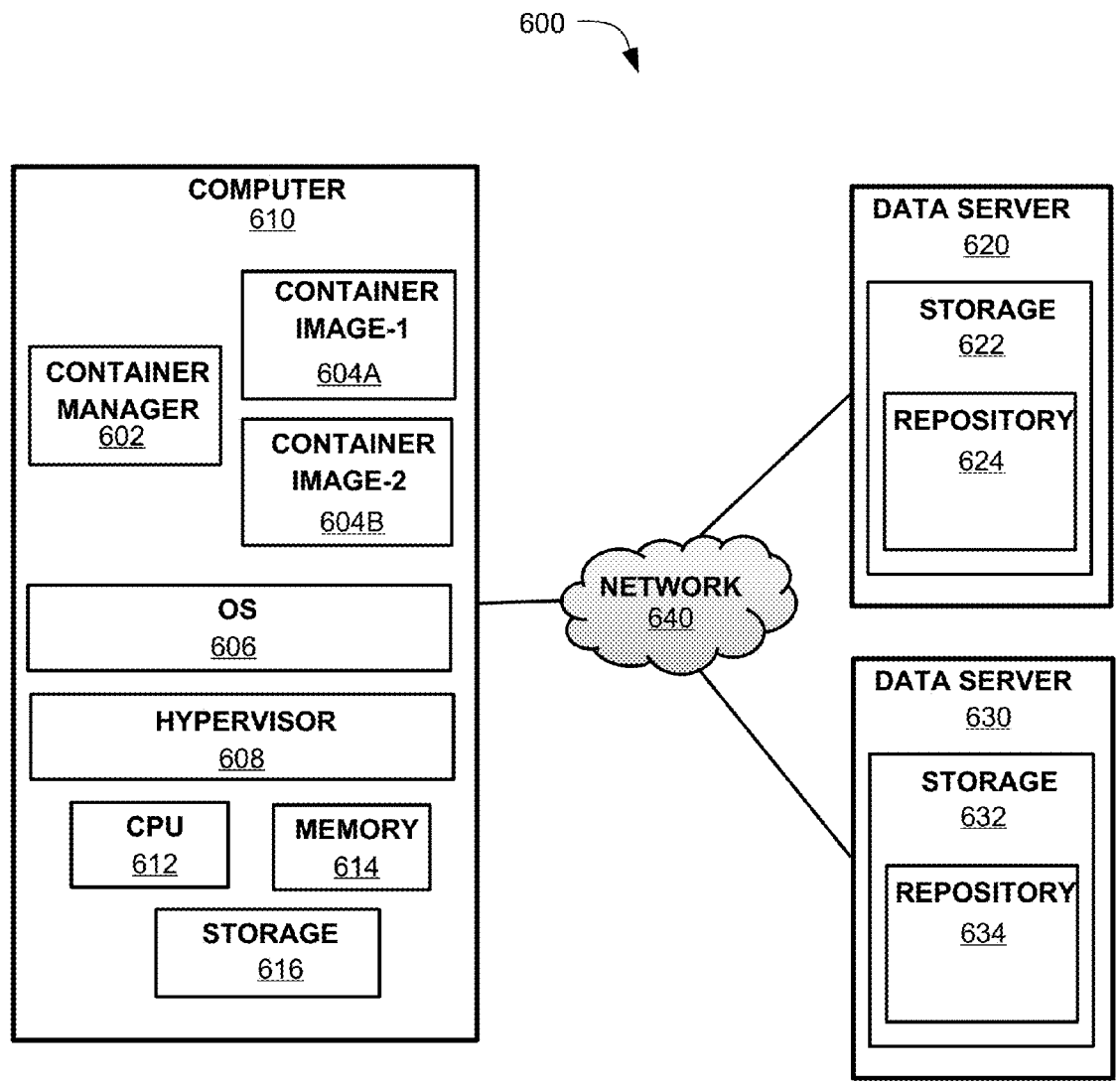
FIG. 6 is a block diagram illustrating a system that may embody methods and structures of the disclosure.

FIG. 6 illustrates an example system 600 that may embody aspects and features of the disclosure. The system includes a computer 610, and data servers, illustrated by data servers 620 and 630, in which the computer and the data servers are interconnected by a network 640. While the example system 600 illustrates the data servers and computer connected by means of network 640, it would be apparent to one of ordinary skill that any one, particular data server, or components of a data server, may be components of, or included within, computer 610 or another computer communicatively coupled to computer 610. It would be further evident to one of ordinary skill in the art that the system 600 may include a single data server, or a plurality of data servers more than illustrated in FIG. 6.

Computer 610 is illustrative of a computer that may perform the example methods disclosed herein. Computer 610 further includes OS 606, CPU 612, memory 614, and storage 616. The OS, CPU, memory, and storage may facilitate execution of container manager 602 in performing methods illustrated by the disclosure to port a source container to a target ISA container. An embodiment may include a hypervisor, such as hypervisor 608 of computer 610, and the hypervisor may manage allocation of the CPU, memory, or storage of the computer to an OS (e.g., OS 606).

A CPU may be any form of processor, such as a single or multi-core processor or processor chip, or a simultaneously multi-threaded (SMT) processor or processor chip (or combination of SMT with a single or multi-core processor or processor chip). Memory 614 may be any or a combination of a main memory, a cache memory, memory included in a co-processor or I/O adapter, or any form of memory accessible by a CPU or a program executing within computer 610.

Computer 610 includes a container manager 602, container image-1 (604A), and container image-2 (604B). Container image-1 and image-2 may be source container images, or may be container images ported to a target ISA, according to aspects of the disclosure. Alternatively, one of the container images (e.g., container image-1) may be a source container and another container image (e.g., container image-2) may be a container image ported from the source container image.

A CPU included in computer 610 may implement a target ISA. A container manager, such as container manager 602, may port a source container image (e.g., container image-1) to the target ISA, and a container may execute the ported container image on computer 610. A container manager may port a source container image (e.g., container image-1) to a ported container image (e.g., container image-2) as part of executing a container with the source container image on computer 610, and the container may execute the ported computer image (e.g., computer image-2). A container image previously ported to the target ISA may be included in computer 610 (e.g., container image-2) and a container may execute the ported container image on computer 610. A container manager may port a source container image (e.g., computer image-1), included in computer 610, or included in another computer, to a target ISA and a container may execute the ported container image (e.g., container image-2) on a computer that implements the target ISA.

Storage 616 may be storage included in computer 610, such as disk storage, solid-state disk, flash storage, or any form or storage element suitable for persistently storing data within computer 610. Alternatively, storage 616 may be storage not included within computer 610 but, instead, storage merely accessible to computer 610, such as system area networked (SAN) storage or storage in a server communicatively coupled to computer 610. While FIG. 6 illustrates computer 610 having a single instance of a CPU, memory, and storage, computer 610 is not intended to be limiting to embodiments. Rather, a computer (such as 610) in the manner of the disclosure may include a plurality of CPUs, memories, or storage elements.

Data servers 620 and 630 include storage elements 622 and 632, respectively. Data servers may be a computer (such as a computer in the manner of computer 610) and storage elements may be storage included in the data server computer, such as disk storage, solid-state disk, flash storage, or any form or storage element suitable for persistently storing data within a computer. Alternatively, storage elements of a data server may be storage not included within the data server but, instead, storage merely accessible to the data server, such as SAN storage or storage in a server communicatively coupled to the data server. As would be apparent to one of ordinary skill in the art, and within the scope of the disclosure, a data server may be any form of computing element capable of including, or accessing, a repository such as repositories 624 and 634.

The storage elements 622 and 632 include file repositories 624 and 634, respectively. A file repository may include various files, layers, or images suitable for incorporation into a container image. A repository may be, or may include, a registry of such files, layers, or images. File repository 624 may include files, layers, or images not included in repository 634, and vice versa. File repository 624 may include all, or just a subset of the files, layers, or images included in repository 634, and vice versa. A repository may include container images within it, or registered with it. A container manager, such as 602 or any embodiment of some or all of the functions of a container manager as disclosed herein, may obtain a source container image from a repository, and may store a ported container image in a repository.

While FIG. 6 illustrates the file repositories as included in storage elements of the data servers, the data servers 620 and 630 are not intended to limit embodiments. Rather, the file repositories may be elements of each data server separate from the storage elements, or may be repositories accessible to the respective data servers, such as by means of network 640. For example, file repository 624 may reside in another computer, or device, connected to network 640 (or, another network, the Internet, or a SAN) and may be accessed by data server 620 over the network.

A container manager, such as container manager 602, may obtain files, layers, or images to incorporate into a container image from a data server, such as 620 or 630. A data server may obtain a file, layer, or image requested by a container manager from a repository located within, or accessible from, another data server. For example, container manager 602 may request data server 620 to provide a particular layer or image, and the requested layer or image may not be included in repository 624. Accordingly, data server 620 may act as a proxy to communicate the request to data server 630, which may include the requested layer or image in repository 634, and communicate that layer or image to data server 620 to provide to container manager 602.

Figure 7:
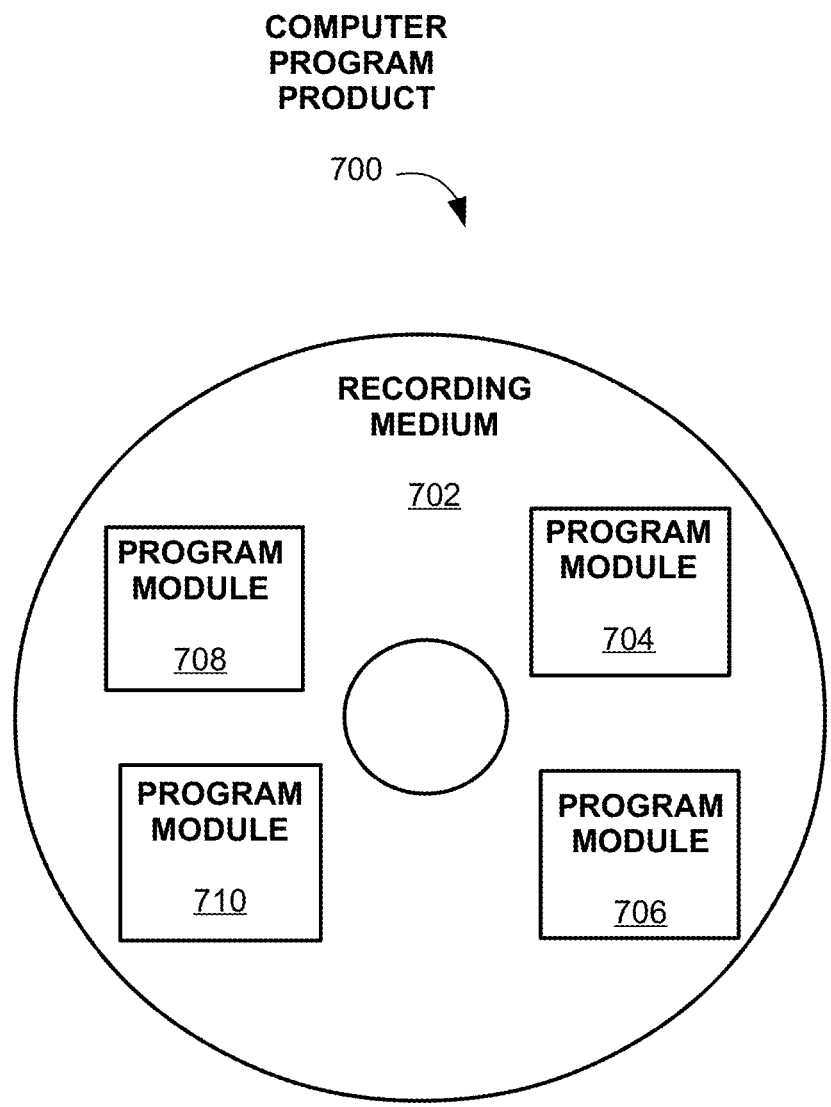
FIG. 7 is a block diagram illustrating a computer program product that may embody methods and structures of the disclosure.

FIG. 7 depicts an article of manufacture or computer program product 700 that is an embodiment of the invention. The computer program product 700 may include a recording medium 702, and the recording medium 702 may store program modules 704, 706, 708, and 710 for a computer to carry out the aspects of the invention. The recording medium 702 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 704, 706, 708, and 710 may direct a computer to implement the aspects of the invention including, but not limited to, the structures and operations illustrated in and described in the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for porting a software container image to a target instruction set architecture (ISA), the software container image selected for execution on a first computer, the first computer implementing the target ISA, the method comprising:
   forming a ported image, the ported image capable of executing on the first computer, the forming performed in association with at least one of preparing the software container image for execution on the first computer and executing the software container image on the first computer;
   selecting a source image, the source image included in the software container image;
   selecting a source component, the source component included in the source image;
   determining that the source component is not compatible with the target ISA, the determining based, at least in part, on the source component dependent on a first ISA, the first ISA different from the target ISA; and
   including in the ported image an at least one first target-ISA equivalent component, the at least one first target-ISA equivalent component performing a function equivalent to at least one function of the source component, the at least one first target-ISA equivalent component compatible with the target ISA, the at least one first target-ISA equivalent component replacing, in the ported image, the source component,
   determining that the source component includes a source binary file, the source binary file not compatible with the target ISA;
   determining that the source component does not have a second target-ISA equivalent component, the second target-ISA equivalent component compatible with the target ISA;
   determining that the source binary file does not have at least one target-ISA equivalent binary file;
   and including, in the at least one first target-ISA equivalent component, the source binary file and at least one target-ISA stub program, the at least one target-ISA stub program invoking execution of the source binary file, the at least one target-ISA stub program invoking execution of at least one ISA translator, the execution of the at least one ISA translator translating the source binary file from the first ISA to the target ISA.

2. The method of claim 1 further comprising:
   determining that the source component has an at least one second target-ISA equivalent component, the at least one second target-ISA equivalent component performing a function equivalent to at least one function of the source component, the at least one second target-ISA equivalent component compatible with the target ISA; and
   including, in the at least one first target-ISA equivalent component, the at least one second target-ISA equivalent component.

3. The method of claim 1 further comprising:
   determining that the source component does not have a second target-ISA equivalent component, the second target-ISA equivalent component compatible with the target ISA;
   forming an at least one second target-ISA equivalent component, the at least one second target-ISA equivalent component performing a function equivalent to at least one function of the source component, the at least one second target-ISA equivalent component compatible with the target ISA; and
   including, in the at least one first target-ISA equivalent component, the at least one second target-ISA equivalent component.

4. The method of claim 1 further comprising:
   determining that the source component includes a source binary file, the source binary file not compatible with the target ISA;
   determining that the source component does not have a second target-ISA equivalent component, the second target-ISA equivalent component compatible with the target ISA;
   determining that source binary file has at least one target-ISA equivalent binary file, the at least one target-ISA equivalent binary file performing a function equivalent to at least one function of the source binary file, the at least one target-ISA equivalent binary file compatible with the target ISA; and
   including, in the at least one first target-ISA equivalent component, the at least one target-ISA equivalent binary file.

5. The method of claim 1 further comprising including, in the first target-ISA equivalent component, the at least one ISA translator.

6. The method of claim 1 wherein the at least one first target-ISA equivalent component includes at least one component included in a repository, and wherein the at least one first target-ISA equivalent component includes the component included in the repository replacing the at least one component in the first target-ISA equivalent component.

7. A computer program product for porting a software container image to a target instruction set architecture (ISA), the software container image selected for execution on a first computer, the first computer implementing the target ISA, the computer program product comprising a computer readable storage medium having program instructions embodied therewith, the program instructions executable by a first computer to perform a method comprising:
   forming, by a second computer, a ported image, the ported image capable of executing on the first computer, the forming performed in association with at least one of preparing the software container image for execution on the first computer and executing the software container image on the first computer;

selecting, by the second computer, a source image, the source image included in the software container image;

selecting, by the second computer, a source component, the source component included in the source image;

determining, by the second computer, that the source component is not compatible with the target ISA, the determining based, at least in part, on the source component dependent on a first ISA, the first ISA different from the target ISA; and including, by the second computer, in the ported image an at least one first target-ISA equivalent component, the at least one first target-ISA equivalent component performing a function equivalent to at least one function of the source component, the at least one first target-ISA equivalent component compatible with the target ISA, the at least one first target-ISA equivalent component replacing, in the ported image, the source component determining, by the second computer, that the source component includes a source binary file, the source binary file not compatible with the target ISA;

determining, by the second computer, that the source component does not have a second target-ISA equivalent component, the second target-ISA equivalent component compatible with the target ISA;

determining, by the second computer, that the source binary file does not have at least one target-ISA equivalent binary file; and including, by the second computer, in the at least one first target-ISA equivalent component, the source binary file and at least one target-ISA stub program, the at least one target-ISA stub program invoking execution of the source binary file, the at least one target-ISA stub program invoking execution of at least one ISA translator, the execution of the at least one ISA translator translating the source binary file from the first ISA to the target ISA.

8. The computer program product of claim 7, the method further comprising:

determining, by the second computer, that the source component has an at least one second target-ISA equivalent component, the at least one second target-ISA equivalent component performing a function equivalent to at least one function of the source component, the at least one second target-ISA equivalent component compatible with the target ISA; and including, by the second computer, in the at least one first target-ISA equivalent component, the at least one second target-ISA equivalent component.

9. The computer program product of claim 7, the method further comprising:

determining, by the second computer, that the source component does not have a second target-ISA equivalent component, the second target-ISA equivalent component compatible with the target ISA;

forming, by the second computer, an at least one second target-ISA equivalent component, the at least one second target-ISA equivalent component performing a function equivalent to at least one function of the source component, the at least one second target-ISA equivalent component compatible with the target ISA; and including, by the second computer, in the at least one first target-ISA equivalent component, the at least one second target-ISA equivalent component.

10. The computer program product of claim 7, the method further comprising:

determining, by the second computer, that the source component includes a source binary file, the source binary file not compatible with the target ISA;

determining, by the second computer, that the source component does not have a second target-ISA equivalent component, the second target-ISA equivalent component compatible with the target ISA;

determining, by the second computer, that source binary file has at least one target-ISA equivalent binary file, the at least one target-ISA equivalent binary file performing a function equivalent to at least one function of the source binary file, the at least one target-ISA equivalent binary file compatible with the target ISA; and including, by the second computer, in the at least one first target-ISA equivalent component, the at least one target-ISA equivalent binary file.

11. The computer program product of claim 7, the method further comprising including, by the second computer, in the first target-ISA equivalent component, the at least one ISA translator.

12. The computer program product of claim 7, wherein the at least one first target-ISA equivalent component includes at least one component included in a repository, and wherein the at least one first target-ISA equivalent component includes the component included in the repository replacing the at least one component in the first target-ISA equivalent component.

13. A system for porting a software container image to a target instruction set architecture (ISA), the software container image selected for execution on a first computer, the first computer implementing the target ISA, the system comprising:

a processor; and a memory in communication with the processor, wherein the system is configured to perform a method, the method comprising:

forming a ported image, the ported image capable of executing on the first computer, the forming performed in association with at least one of preparing the software container image for execution on the first computer and executing the software container image on the first computer;

selecting a source image, the source image included in the software container image;

selecting a source component, the source component included in the source image;

determining that the source component is not compatible with the target ISA, the determining based, at least in part, on the source component dependent on a first ISA, the first ISA different from the target ISA; and including in the ported image an at least one first target-ISA equivalent component, the at least one first target-ISA equivalent component performing a function equivalent to at least one function of the source component, the at least one first target-ISA equivalent component compatible with the target ISA, the at least one first target-ISA equivalent component replacing, in the ported image, the source component determining that the source component includes a source binary file, the source binary file not compatible with the target ISA;

determining that the source component does not have a second target-ISA equivalent component, the second target-ISA equivalent component compatible with the target ISA;

determining that the source binary file does not have at least one target-ISA equivalent binary file; and including, in the at least one first target-ISA equivalent component, the source binary file and at least one target-ISA stub program, the at least one target-ISA stub program invoking execution of the source binary file, the at least one target-ISA stub program invoking execution of at least one ISA translator, the execution of the at least one ISA translator translating the source binary file from the first ISA to the target ISA.

14. The system of claim 13, the method further comprising:

determining that the source component has an at least one second target-ISA equivalent component, the at least one second target-ISA equivalent component performing a function equivalent to at least one function of the source component, the at least one second target-ISA equivalent component compatible with the target ISA; and including, in the at least one first target-ISA equivalent component, the at least one second target-ISA equivalent component.

15. The system of claim 13, the method further comprising:

determining that the source component does not have a second target-ISA equivalent component, the second target-ISA equivalent component compatible with the target ISA;

forming an at least one second target-ISA equivalent component, the at least one second target-ISA equivalent component performing a function equivalent to at least one function of the source component, the at least one second target-ISA equivalent component compatible with the target ISA; and including, in the at least one first target-ISA equivalent component, the at least one second target-ISA equivalent component.

16. The system of claim 13, the method further comprising:

determining that the source component includes a source binary file, the source binary file not compatible with the target ISA;

determining that the source component does not have a second target-ISA equivalent component, the second target-ISA equivalent component compatible with the target ISA;

determining that source binary file has at least one target-ISA equivalent binary file, the at least one target-ISA equivalent binary file performing a function equivalent to at least one function of the source binary file, the at least one target-ISA equivalent binary file compatible with the target ISA; and including, in the at least one first target-ISA equivalent component, the at least one target-ISA equivalent binary file.

17. The system of claim 13, wherein the at least one first target-ISA equivalent component includes at least one component included in a repository, and wherein the at least one first target-ISA equivalent component includes the component included in the repository replacing the at least one component in the first target-ISA equivalent component.

* * * * *